United States Patent [19]
Weller et al.

[11] Patent Number: 5,639,392
[45] Date of Patent: Jun. 17, 1997

[54] LOCKING CRANK MECHANISM

[75] Inventors: William P. Weller; Chad T. Behrens, both of Minneapolis, Minn.

[73] Assignee: Century Mfg. Co., Bloomington, Minn.

[21] Appl. No.: 528,132

[22] Filed: Sep. 14, 1995

[51] Int. Cl.⁶ ................................................. B23K 9/00
[52] U.S. Cl. ...................... 219/130.1; 74/547; 336/133
[58] Field of Search .......................... 219/130.1, 130.4, 219/137.05; 74/528, 547; 336/130, 131, 132, 133, 134, 135

[56] References Cited

U.S. PATENT DOCUMENTS

| | | |
|---|---|---|
| Re. 16,012 | 3/1925 | Holslaq . |
| Re. 22,609 | 2/1945 | Steinert . |
| 1,098,549 | 6/1914 | Barnum . |
| 1,406,973 | 2/1922 | Carter . |
| 1,659,506 | 2/1928 | Wheeler . |
| 1,677,064 | 7/1928 | Watt . |
| 1,679,263 | 7/1928 | Owen ................................ 336/133 |
| 2,493,388 | 1/1950 | Candy ............................... 336/133 |
| 2,567,617 | 9/1951 | Pedersen ........................... 336/133 |
| 2,597,689 | 5/1952 | Welch, Jr. ........................ 219/130.4 |
| 3,649,941 | 3/1972 | Hart . |
| 3,689,861 | 9/1972 | Gibson ............................. 336/133 |
| 5,192,122 | 3/1993 | Hill .................................. 74/528 |

*Primary Examiner*—Clifford C. Shaw
*Attorney, Agent, or Firm*—Dorsey & Whitney LLP

[57] ABSTRACT

An arc welder has a locking crank mechanism for adjusting and securing the adjustment of a transformer having a moveable transformer core shunt. The arc welder has an adjustment base, with a plurality of locking detents in a substantially circular planar ring configuration. The position of the base is fixed in relation to the position of the transformer. The arc welder also has a substantially circular crank plate with a lever opening, with the crank plate mounted for rotation adjacent to and concentric with the locking detents. A mechanical link operably connects the crank plate and the moveable core shunt for adjusting the position of the moveable core shunt through rotation of the crank plate. A lever is mounted to pass through the lever opening in the crank plate. The lever is mounted to pivot between (i) an adjustment position in which motion of the lever to rotate the crank plate causes motion of the mechanical link and adjustment of the position of the moveable core shunt, and (ii) a locking position in which the lever engages at least one of the locking detents in the base and prevents motion of the crank plate and mechanical link.

19 Claims, 3 Drawing Sheets

LOCKING CRANK MECHANISM

TECHNICAL FIELD

The invention relates, generally, to arc welding apparatus and adjustment mechanisms. In particular, the invention relates to an improvement for adjusting and securing the position of a core shunt within the transformer of an arc welding system.

BACKGROUND

The purpose of arc welding, like most other forms of welding, is to adhere two or more pieces of metal to each other at a specified location. This is achieved with arc welding by maintaining an electrical arc between the material to be welded and the welding material. A transformer is utilized to generate the current that is required to create and maintain such electrical arcs. Because the quality of the weld depends upon the heat that is created by the arc, most arc welding systems allow the operator to adjust the welding temperature by adjusting the transformer's output current. Because the level of a transformer's output current is proportional to the amount of magnetic flux passing through the output winding, one can vary the output current by altering the amount of flux that passes through this winding. Adjustable core shunts are commonly used to vary the magnetic path linking the primary winding to the output winding of the transformer, thereby altering the amount of magnetic flux that passes through the output winding. In turn, this allows one to vary and control the magnitude of the welding arc's current.

An effective means for controlling the position of the adjustable core shunt is to utilize a screw and nut configuration to mount the core shunt so that it may be moved among a variety of positions relative to the transformer core windings, see, e.g., Re. U.S. Pat. No. 16,012. This configuration is simple, inexpensive, and compact. However, a critical drawback of such a configuration is that the adjustment screw tends to drift because of the inherent vibration and magnetic forces to which the core shunt is subjected during normal operation. This drifting causes the shunt's position to change, which causes the welding arc current to vary. This is a significant problem, because a stable welding arc is essential for effective electrical arc welding.

One industry solution to this problem has been to utilize an adjustment screw with relatively fine threads. This approach solves the wandering problem; however, it is not desirable, because numerous turns of the adjustment screw mechanism are required to effectively adjust the position of the core shunt.

Another remedy to this problem has been to add friction enhancing components to a coarsely threaded screw configuration. This effectively reduces the drift problem, and a relatively small number of turns are required to adjust the shunt. However, with this approach, a user must apply a substantially higher amount of rotational force to adjust the core's position.

Yet another approach in solving the drift problem has been to employ vibration-damping means to reduce some of the associated forces applied to the screw mechanism. This solution is not completely effective in reducing the vibration and magnetic forces. Therefore, it does not satisfactorily reduce the drift of the adjustment screw mechanism during operation. In addition, the user is required to apply increased force when adjusting the screw mechanism to compensate for the increased resistance due to the friction-increasing, damping components. Accordingly, what is needed in the art is a mechanism for adjusting the position of a magnetic core shunt that requires minimal effort or applied force in adjusting the shunt's position, yet is capable of adequately maintaining the shunt's position when it is exposed to vibration and magnetic forces.

SUMMARY

The present invention relates to a locking crank mechanism that satisfies this need to prevent the adjustment screw from drifting during welding, thereby maintaining the desired position for the magnetic core shut. The user is not restricted to using an adjustment screw with fine threads. Therefore, a coarsely threaded screw may be used, reducing the number of turns necessary to adjust the shunt's position, without encountering the drift problem. In addition, the present invention does not require additional components that add friction and would make it harder for the user to adjust welding current. Another advantage of the present invention's preferred embodiment is that the adjustment crank handle folds into a recess in the locking crank mechanism when the crank position is set and locked.

In one embodiment, the locking crank mechanism of the present invention comprises a circular crank plate having a lever opening located near the periphery of the crank plate, a lock ring having a number of uniformly distributed locking detents, a base that supports and anchors the lock ring, and a lever that serves as an adjustment handle and is connected through the lever opening by pivot means. This pivot means permits the lever to pivot between an adjustment position in which the lever is perpendicular to the crank plate and a locking position in which the lever lies substantially in the plane of the crank plate.

The crank plate and lock ring are concentric, with the crank plate rotatably mounted adjacent the lock ring. The lever includes a locking protrusion at one end and a grip handle at the other end. When the lever is pivoted into a locking position, the locking protrusion fits into a particular locking detent of the lock ring that corresponds to the rotational location of the crank plate relative to the lock ring. The grip handle provides a means for rotating the crank plate when the lever is pivoted into an adjustment position, whereby the locking protrusion is not engaged with any of the locking detents and the mechanism may be rotated to the desired adjustment.

DETAILED DESCRIPTION OF THE PREFERRED EMBODIMENT

Figure 1:
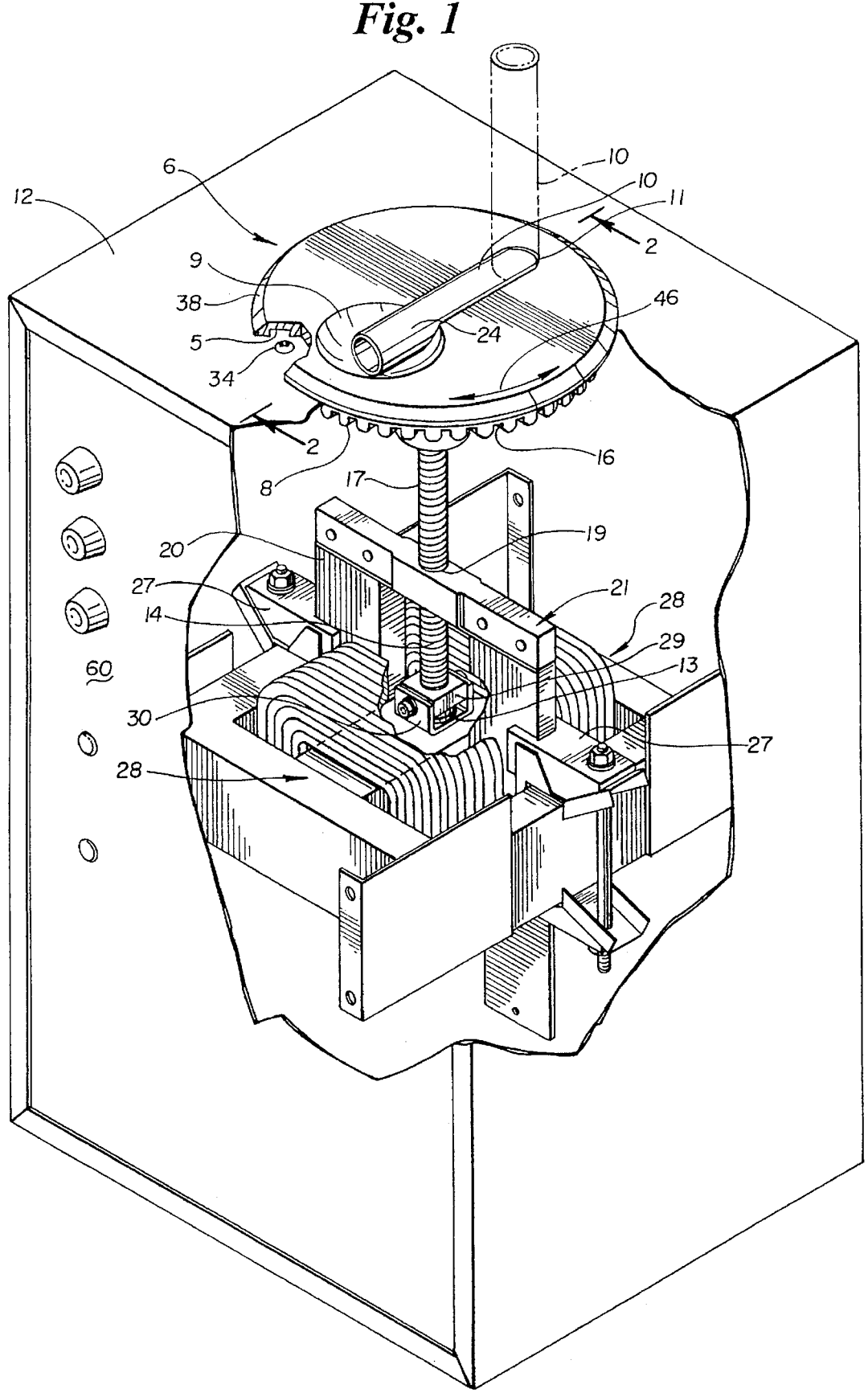
FIG. 1 is a perspective view of one embodiment of the present invention.
Figure 2:
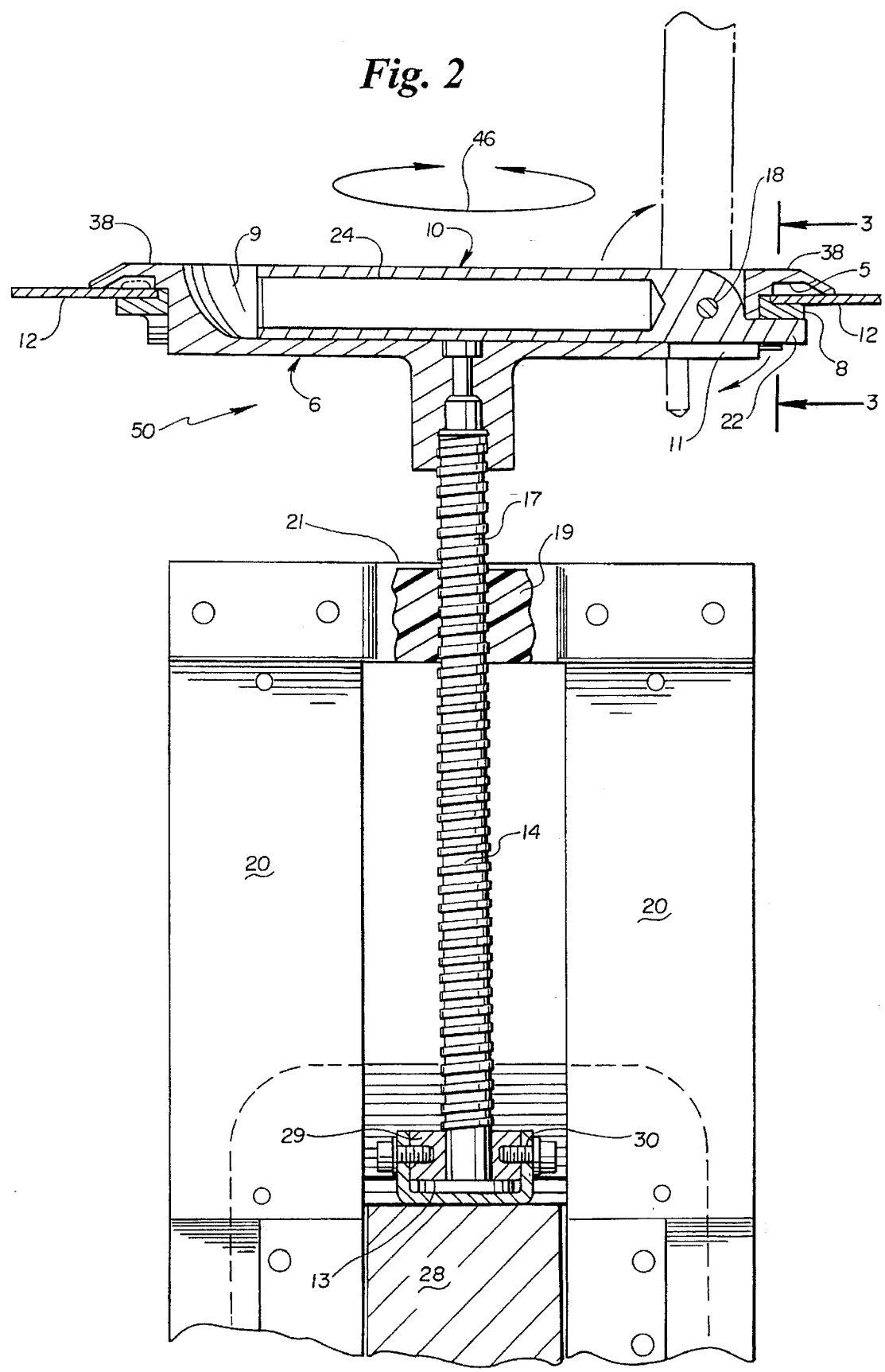
FIG. 2 is a sectional view of the present invention, taken along line 2—2 of FIG. 1.

As shown in FIGS. 1 and 2 of the drawings, the present invention relates to an arc welder transformer core shunt adjustment device 50 with a locking crank mechanism. This mechanism generally comprises a substantially planar crank plate 6 with a pivoting lever 10 mounted on an adjustment base 12. The base 12 has a plurality of locking detents in a substantially circular, planar ring configuration. These detents are preferably arranged in the form of a lock ring 8 mounted in the base 12.

The crank plate 6 and lock ring 8 are both substantially circular and concentric. The lock ring 8 fits beneath the rim of a circular opening in the base 12. The crank plate 6 fits into the interior of the lock ring 8, with a flange 38 extending out over the lock ring 8 and base 12.

The lever 10 is connected to the crank plate 6 at a lever opening 11 in the peripheral region of the crank plate 6 by a pivot pin 18 that is fixed on each of its ends to opposite sides of the lever opening 11 of the crank plate 6. This enables the lever 10 to pivot about the pin 18 in a plane orthogonal to the plane of the crank plate 6. Pivoting about pin 18 permits the lever 10 to move between a raised, adjustment position (shown in phantom lines), in which the lever 10 is perpendicular to the crank plate 6 and a lowered, locking position in which the lever 10 lies substantially in the plane of the crank plate 6.

The base 12 is the top plate of a housing 60 surrounding a transformer assembly 28. The lock ring 8 is fastened to the base 12 by connection screws 34 (only one of which is shown in FIG. 1) passing through holes 35, washers 36, and nuts 37 (see FIGS. 4 and 5) to secure the lock ring 8 in a fixed position relative to the transformer assembly 28. The depiction of FIG. 5 shows in a sectional view a lock ring screw 34, washer 36, and nut 37 connecting the lock ring 8 to the base 12. The lock ring 8 and base 12 partially support the crank plate 6 at the lower side of flange 38. This aids the crank plate 6 to rotate (see directional arrow 46) in either direction in a plane substantially parallel to the plane of the lock ring 8 (i.e., to rotate adjacent to and concentric with the locking detents). The underside of crank plate 6 includes a screw-head clearance channel 5 to enable the crank plate 6 to rotate on the base 12 without contacting the lock ring screws 34.

Figure 4:
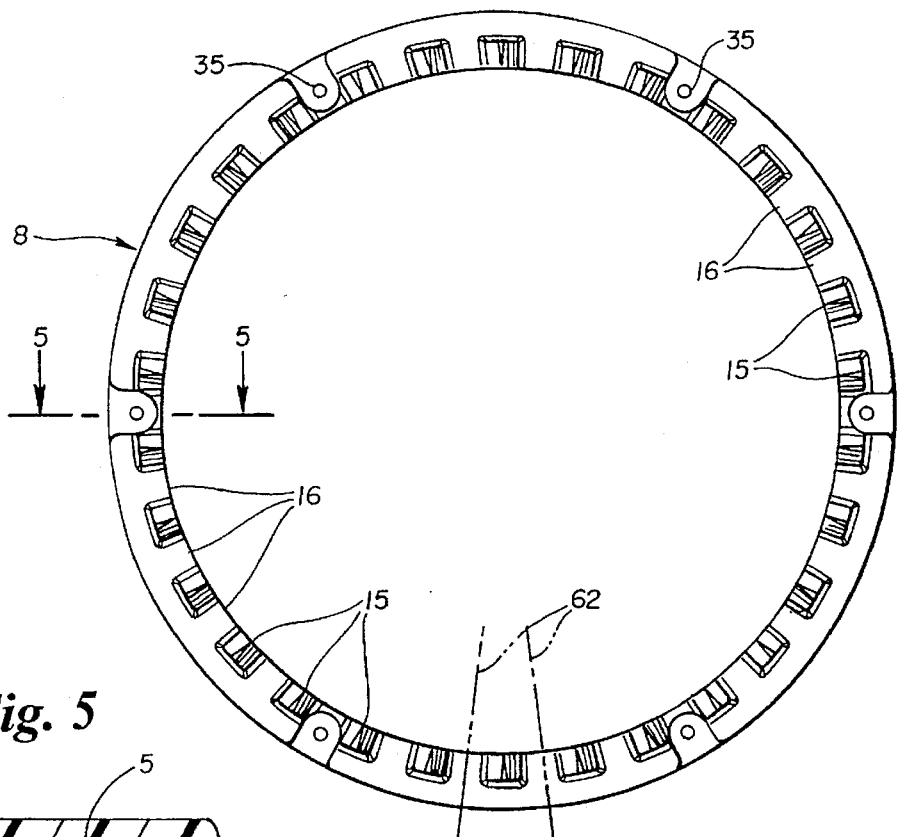
FIG. 4 is a bottom view of the lock ring.
Figure 5:
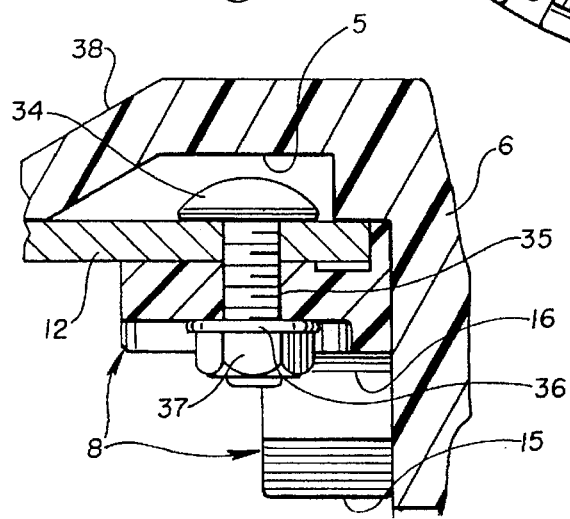
FIG. 5 is a sectional view taken along line 4—4 of FIG. 4, showing a lock ring fastener screw with the corresponding crank plate clearance slot.

As best seen in FIG. 4, the underside of the lock ring 8 (i.e., facing the transformer assembly 28) contains numerous teeth 15, forming a like number of channels 16 uniformly distributed as locking detents about the lock ring 8. The longitudinal axis 62 of each channel 16 points toward the center of the lock ring 8 and is preferably substantially parallel with the plane of the crank plate 6.

The lever 10 has a grip handle 24 at its end opposite the location of pin 18 and a locking protrusion 22 at the end adjacent the pin 18. The locking protrusion 22 is configured to fit into any one of the channels 16 when the handle 24 is rotated down into the recessed region 9 on the upper side of crank plate 6 (the locking position). Connected at the center of the underside of the crank plate 6 is a mechanical link that operably connects the crank plate 6 to a moveable component of the transformer assembly 28, namely the shunt 20. The mechanical link is preferably a partially threaded adjustment shaft 14, which has a shaft mounting flange 13 at the end opposite the end rigidly connected to the crank plate 6. The shaft 14 is rotatably secured to the transformer assembly 28 by shaft collar 29 and collar harness 30, which capture flange 13. The shaft collar 29 and collar harness 30 hold the shaft 14 in a vertical position, extending perpendicularly downward from the crank plate 6. The shaft 14 has threaded segment 17 passing through a threaded bore 19 of shunt adjustment bracket 21 that is fixed to the core shunt 20. Shunt guides 27 are fixed to the transformer assembly 28, partially embracing the exterior sides of the transformer shunt 20 for maintenance of its horizontal alignment. The threaded segment 17 of the shaft 14 is located at a position relative to the shunt adjustment bracket 21 that corresponds to the acceptable core shunt 20 positional range. To reduce the rotational motion required for even a small adjustment, the shaft 14 is relatively coarsely threaded.

With the preceding structure in mind, the operation of the adjustment device 50 can now be explained. By rotating the crank plate 6 and thus the shaft 14 in either direction, the user can vary the position of the magnetic core shunt 20 along a linear path. Because the shaft 14 is rotatably secured by the shaft collar 29 and collar harness 30 in a vertically fixed position relative to the transformer assembly 28, the shunt adjustment bracket 21 travels on the shaft 14, and thus, the core shunt 20 moves along the shaft's threaded segment 17 in a direction determined by the direction of rotation of the crank plate 6. (The shaft 14 rotates, but otherwise its position remains substantially constant with respect to the base 12.) This allows the user, by rotating crank plate 6, to either shunt more magnetic flux away, or add magnetic flux to, the output secondary winding of the arc welding transformer 28. In turn, this enables the user to control the amount of current that is utilized for a particular weld.

Figure 3:
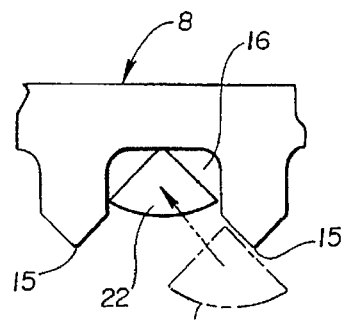
FIG. 3 is a cross-sectional detail view, taken along line 3—3 of FIG. 2, showing the locking protrusion engaged into a lock ring channel.

The lever 10 has two primary functions in the adjustment operation: (1) serving as a handle to enable the user to rotate the crank plate 6 when the lever 10 is in an upright cranking position (phantom lines in FIGS. 1 and 2), and (2) securing the crank plate 6 relative to the lock ring 8 when the lever 10 is folded into a locking position in the plane of crank plate 6, as shown in FIGS. 1 and 2. FIG. 3 is a detail, cross-sectional view of the locking protrusion 22 engaged into a lock ring channel 16. The locking protrusion 22 assumes this position when lever 10 is in the plane of crank plate 6. In FIG. 4, lock ring teeth 15 and channels 16 are shown in an underside view of the lock ring 8.

The pivot pin 18 of lever 10 is located nearer the periphery of the crank plate 6 than the center for two reasons. First, when the lever 10 is raised to the position shown by phantom lines in FIG. 1, the operator has adequate leverage to rotate the crank plate 6. Second, when the lever 10 is lowered into its locked position, the forces operating on the locking protrusion 22 and the pin 18 are manageable, because the length of the locking protrusion 22 from pin 18 is relatively short.

One embodiment of the lever 10 uses a unitary piece of material for the lever 10, protrusion 22, and grip handle 24, for cost and strength advantages. However, another embodiment of the invention utilizes a grip handle that rotates around the longitudinal axis of lever 10 allowing an operator to firmly grasp the handle while rotating the crank plate.

As shown in FIG. 3, the cross-sectional shape of the locking protrusion 22 is that of an arched triangle. The dimensions of this cross-section are selected to enable the protrusion 22 to securely fit within the substantially rectangularly shaped upper portion of each of the plurality of lock ring channels 16. The angled shape of the lower portions (as seen in FIG. 3) of the walls of channel 16 provides a registration chamfer that enables a user to more easily guide the lever 10 from the mouth of the channel 16 and into a locking position (i.e., into registration in channel 16), regardless of the exact rotational position of the crank plate 6 relative to the lock ring 8. (The phantom line drawing of locking protrusion 22 in FIG. 3 shows how it is guided into registration.) The rectangularly shaped upper portion of each channel 16 provides a secure connection between the locking protrusion 22 and a selected channel 16 to prevent the protrusion 22 from riding out of position when the lever 10 is in a locking position. The preferred triangular shape for the cross-section of the angled portions of each of the channels is a 90–45–45 degree isosceles triangle, as shown in FIG. 3. (That is, the mouth of the channel 16 opens with two sides that taper inward along planes that, if extended, would meet at ninety degrees.) This particular shape is the result of a compromise between two divergent options: having a smaller number of channels with wide bases for easy insertion of the locking protrusion 22, or having a larger number of channels with small bases to provide for fine rotational adjustment, while somewhat increasing the difficulty of insertion of the locking protrusion 22.

It will be seen by those skilled in the art that various changes may be made without departing from the spirit and scope of the invention. For example, it will be clear that the invention could be implemented with different shapes for the channels 16 and the locking protrusion 22 cross-section. In addition, the lock ring 8 and base 12 can be formed as one element. Also, the channels 16 can be configured to make their longitudinal axes form angles, relative to the plane of the crank plate 6, rather than being essentially parallel to that plane. Accordingly, the invention is not limited to what is shown in the drawings and described in the specification but only as indicated in the appended claims.

What is claimed is:

1. A device for adjusting and locking the position of a moveable component, the device comprising:

an adjustment base, having a plurality of locking detents in a substantially circular, planar ring configuration;

a substantially circular crank plate with a lever opening, the crank plate mounted for rotation adjacent to and concentric with the locking detents;

a mechanical link operably connected between the crank plate and the moveable component for adjusting the position of the moveable component through rotation of the crank plate; and a lever mounted to pass through the lever opening in the crank plate, the lever being mounted to pivot between (i) an adjustment position in which motion of the lever to rotate the crank plate causes motion of the mechanical link and adjustment of the position of the moveable component, and (ii) a locking position in which the lever engages at least one of the locking detents in the base and prevents rotational motion of the crank plate and mechanical link.

2. The device of claim 1, wherein the mechanical link is a shaft mounted for rotation and having threads for engaging corresponding threads associated with the moveable component.

3. The device of claim 2, wherein rotation of the shaft causes the moveable component's position to change in relation to that of the base, while the position of the shaft remains substantially constant with respect to that of the base.

4. The device of claim 1, wherein the crank plate is at least partially supported by the base.

5. The device of claim 1, wherein each locking detent is a channel and the lever has a locking protrusion that engages at least one of the channels when the lever is in a locking position.

6. The device of claim 5, wherein the crank plate is substantially planar and the longitudinal axis of each locking detent channel is substantially parallel with the plane of the crank plate.

7. The device of claim 6, wherein the shape of at least part of each locking detent channel tapers inward from the mouth of the channel.

8. The device of claim 1, wherein the lever is pivotally mounted to the crank plate at a position that is adjacent the outer periphery of the crank plate.

9. The device of claim 1, wherein the movable component is a core shunt in a transformer.

10. An arc welder with a locking crank mechanism for adjusting and securing the adjustment of a transformer with a moveable transformer core shunt, the arc welder comprising:

an adjustment base, having a plurality of locking detents in a substantially circular planar ring configuration, the position of the base being substantially fixed in relation to the position of the transformer;

a substantially circular crank plate with a lever opening, the crank plate mounted for rotation adjacent to and concentric with the locking detents;

a mechanical link operably connected between the crank plate and the moveable core shunt for adjusting the position of the moveable core shunt through rotation of the crank plate; and a lever mounted to pass through the lever opening in the crank plate, the lever being mounted to pivot between (i) an adjustment position in which motion of the lever to rotate the crank plate causes motion of the mechanical link and adjustment of the position of the moveable core shunt, and (ii) a locking position in which the lever engages at least one of the locking detents in the base and prevents motion of the crank plate and mechanical link.

11. The arc welder of claim 10, wherein the mechanical link is a shaft mounted for rotation and having threads for engaging corresponding threads associated with the moveable core shunt.

12. The arc welder of claim 11, wherein rotation of the shaft causes the moveable core shunt's position to change in relation to that of the base, while the position of the shaft remains substantially constant with respect to that of the base.

13. The arc welder of claim 10, wherein the crank plate is at least partially supported by the base.

14. The device of claim 10, wherein each locking detent is a channel and the lever has a locking protrusion that engages at least one of the channels when the lever is in a locking position.

15. The device of claim 14, wherein the crank plate is substantially planar and the longitudinal axis of each locking detent channel is substantially parallel with a plane of the crank plate.

16. The device of claim 15, wherein the shape of at least part of each locking detent channel tapers inward from the mouth of the channel.

17. The device of claim 10, wherein the lever is pivotally mounted to the crank plate at a position that is adjacent the outer periphery of the crank plate.

18. The device of claim 10, wherein the mechanical link is a threaded shaft and the movable core shunt in the transformer is operably connected to a threaded bracket on the threaded shaft.

19. The device of claim 18 further comprising at least one shunt guide for maintaining the horizontal alignment of the moveable transformer core shunt.

* * * * *